D. B. CHAPIN.
TOBACCO-DRIER.
No. 170,469. Patented Nov. 30, 1875.
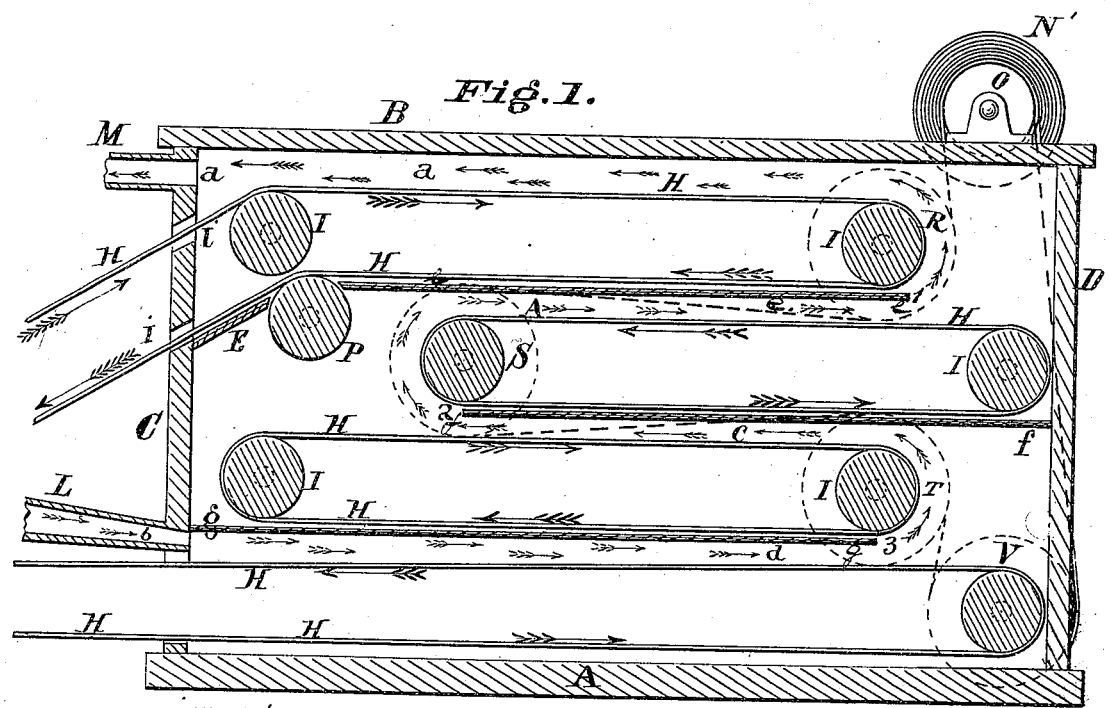
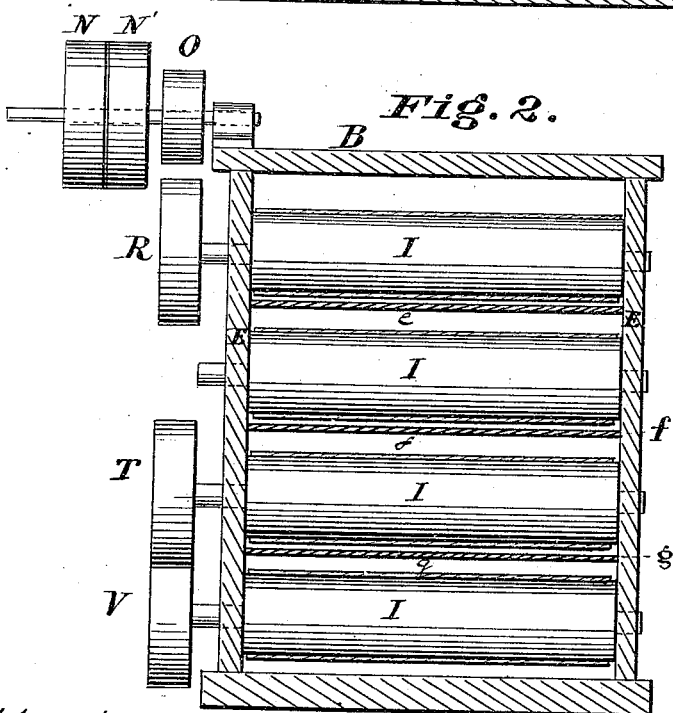
Attest.
John O'Gara
Herman Merrell
Inventor.
Dwight B. Chapin
By Wood & Boyd
his Attorneys

UNITED STATES PATENT OFFICE.

DWIGHT B. CHAPIN, OF COVINGTON, KENTUCKY.

IMPROVEMENT IN TOBACCO-DRIERS.

Specification forming part of Letters Patent No. 170,469, dated November 30, 1875; application filed March 31, 1875.

*To all whom it may concern:*

Be it known that I, DWIGHT B. CHAPIN, of Covington, in the county of Kenton and State of Kentucky, have invented certain new and useful Improvements in a Device for Drying and Casing Tobacco, of which the following is a specification:

My improvement refers, first, to an improvement in driers for drying tobacco and other material; and consists in providing a series of endless carriers, arranged in a series of zigzag flues, through which a current of air is forced or drawn to carry off the moisture evaporated, and to speed the drying operation.

My invention relates, secondly, to casing tobacco by means of the same device used in drying; but a current of steam or humid air is used for moistening, instead of heated or normal air for drying, the tobacco treated.

The various parts of this apparatus are constructed and arranged in the manner substantially described in the following specification.

Figure 1 represents a longitudinal vertical section through the center of the drier. Fig. 2 is a rear elevation with the end of the chamber removed.

A, B, C, and D represent the top, bottom, front, and rear walls of the chamber or drier. E E represent side walls of the same. *a, b, c,* and *d* represent a continuous flue, or a series of zigzag flues, formed in the chamber by means of the horizontal partitions *e, f,* and *g,* which spring from the side walls E, and alternately from the front and rear walls C D, as shown in Fig. 1. I I I I represent drums revolving on axial bearings attached to the side walls E E. Any convenient form of mounting them may be employed. Two of these drums are placed in each one of the series of horizontal flues, as shown in Fig. 1. H H represent endless aprons passing around drums I, and being revolved with said drums. The upper apron is passed through apertures *i i* in the front wall, and made to pass around a drum outside of the chamber. (This latter drum is not shown in the drawing.) When it is desirable to have this carrier pass in at the angle here shown, a drum, P, is required, either inside or just outside of the chamber, to prevent the sagging of the apron. This upper or feeding apron can be made to enter the oven in the same manner as that of the lower carrier or apron, in which case one of the drums may be outside of the chamber, and in the same plane as the drum at the rear end of the flue. The lower apron or carrier passes out at the bottom at the front end, in the manner here shown. L represents a spout or flue for conveying air into the bottom of the flues. The air passes, in the direction shown by the arrows, alternately over the top of the several series of endless aprons, and passes out of the drier at M, carrying off the moisture absorbed from the article to be dried. A pressure or fan blower is designed to be used to speed the drying, by forcing either heated or normal air into the flues.

It is evident that the blower may be placed at the top and used as an exhaust, or the current may be driven over the aprons through the flues by forcing the air in the reverse direction from that indicated by the arrows; but the plan shown I deem the best.

N represents a loose pulley, and N' the main driving-pulley. The series of endless aprons are represented as being revolved by a belt, (shown in dotted lines in Fig. 1,) driven by pulleys O, R, S, T, and V, these pulleys being, respectively, attached to one of the driving-drums I, upon which the aprons revolve. Spur-gearing may be used as intermediate conveyers of power, if desired. Pulleys I may be mounted on laterally-adjustable bearings, so as to tighten or loosen the several aprons.

The aprons may be made of duck, felt, or other suitable material; and slats may be used transversely across the aprons, to assist in carrying the material over the aprons, if desired.

The mode of operation of drying tobacco and other material is as follows: The article to be dried is placed upon the top apron outside of the chamber, and is carried by the apron into the upper flue, and passed slowly through it. As the apron passes over the drum at the rear end of the flue it is dumped onto the apron beneath in the next flue, and the material is thereby turned over, so as to present other surfaces to the current of air, which is forced through the flues over the top surface of the aprons. This same mode of operation is carried successively through each of the flues, and the tobacco is finally carried out of the chamber by the bottom apron, from which it is removed. A current of air is forced over the aprons, passing successively over the several carriers, through the flues, and escapes charged with moisture at the top at M. This outlet may be varied in size and location, and one or more escape-flues, regulated by a damper, may be employed.

The speed at which the carriers are revolved should be adjusted so as to have the material thoroughly dried by passing through the chamber in the manner described.

Scrapers may be placed under each of the the aprons at 1 2 3, as shown, to prevent the material from adhering to the under side of the aprons.

When it is desired to moisten tobacco, it is fed into the drier in the same manner as for drying, and, instead of forcing a current of dry or heated air through the flues, a jet of steam or a current of humid air is introduced into the flues, and the tobacco on the aprons absorbs the moisture from the air, and is cased or dampened by this process.

I claim as my invention—

The combination, in a tobacco-drier, of the series of alternating horizontal partitions $e$, $f$, and $g$, the alternating endless traveling aprons, the upper feed-apron passing through the casing of the drier, and the lower carrier-apron passing through the casing of the drying-chamber, the whole being constructed for operation substantially as described.

In testimony whereof I have hereunto set my hand this 25th day of March, 1875.

DWIGHT B. CHAPIN.

Witnesses:
E. R. STILWELL,
EDWARD BOYD.